Figure 1:
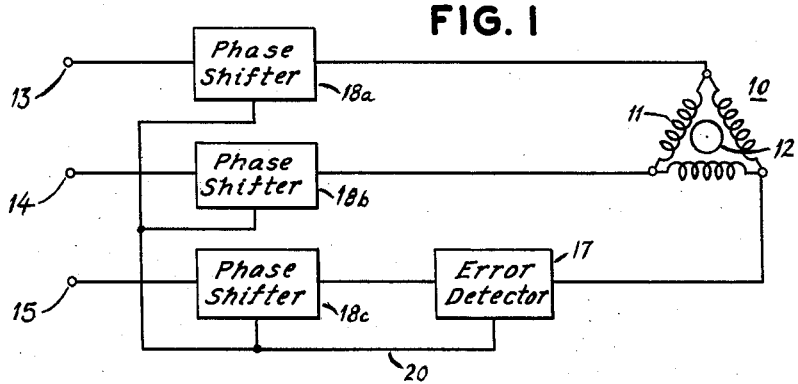

United States Patent Office 3,195,032
Patented July 13, 1965

3,195,032
STABILIZING SYSTEM FOR SYNCHRONOUS MOTOR OR GENERATOR
John R. Shonnard, Montclair, N.J., and Robert L. Easson, Valley Stream, N.Y., assignors to Litton Systems, Inc., Beverly Hills, Calif., a corporation of Maryland
Filed May 25, 1961, Ser. No. 112,710
2 Claims. (Cl. 318—175)

This invention relates to synchronous rotating machines, such as electric motors and generators, and particularly to means for stabilizing the operation of such machines. An important application of the invention is in facsimile apparatus where the recording mechanism is desirably operated at a precise unvarying speed.

An object of the invention is to provide improved means for minimizing the hunting or oscillations of the rotor that, in the case of a synchronous motor, is caused for example by variations in load or in the supply voltage.

The conventional form of synchronous motor embodies a rotating stator field and a rotor provided with means for generating magnetic poles, interacting with the rotating field of the stator to provide a synchronous or constant speed rotation of the rotor. As well known, under steady load conditions, the rotor assumes a predetermined angular relation to the rotating field, but moves ahead or behind the steady-state relation upon changes in load. In case of a sudden increase in the load on the motor, for example, the rotor will be displaced in phase backwards in relation to the rotating field. It will assume a new phase position in which the correct phase angle with the rotating field is obtained to supply the required increase of power. On account of the inertia of the rotor and connected machine parts, the displacement of the rotor will cause it to overshoot, this resulting in oscillations or so-called "hunting" of the rotor. Various expedients have been proposed to overcome hunting, such as the use of amortisseur windings.

Amortisseur windings are only useful to a limited extent, being ineffective for precision machines such as facsimile recording devices where appreciable hunting cannot be tolerated. In a facsimile recorder, a very slight amount of drive oscillation produces objectional jitter in the copy. For example, less than one minute of shaft displacement angle where 180 degrees represents the spacing of adjacent poles, produces objectionable variations in some types of recorded copy. It is essential in such systems, and many other motor driven systems, to reduce the hunting to an extent which is impossible with prior antihunting systems. It has been found that even small changes in the load, due to frictional variations in the supporting ball bearings for example, cause undesirable disturbances of the motor drive and produce oscillations of the rotor assembly. Similarly, sudden changes in the line voltage of the source employed for driving the motor may give rise to a hunting problem.

The problem of hunting is also encountered in synchronous generator systems, since usually sudden load variations occur faster than the regulator of the driving turbine or other prime mover can operate. By utilizing the invention, hunting in a synchronous generator can be reduced in the same manner as in synchronous motor drives.

When the angular position of a rotating synchronous machine changes in response to a change in load or system voltage, the magnitude of the line current to the motor or generator varies. In accordance with the present invention, this change in the magnitude of the motor current or generator output current is detected and employed to shift the phase of the current in the line by a suitable phase shifting arrangement. The phase shift in the line to the motor (or generator) is in the correct sense to alter the phase of the impressed voltage on the motor winding (or the generator voltage) and oppose the tendency of the rotor to change its angle. In this manner, a compensating effect is produced to correct the power output of the motor or generator, and maintain the proper phase relation of the rotor, thereby preventing hunting or oscillation of the rotor. The stabilizing system according to the invention then envisions a simple arrangement for detecting the instantaneous change in the amplitude of the line current, and employing this change to effect a correction of the transient conditions which lead to hunting of the rotor.

It is an object of the invention therefore to prevent or minimize hunting by changing the phase of the line current to or from a synchronous rotating machine in response to a condition that would cause hunting or oscillation of the rotor.

Another object of the invention is to change the circuit conditions of a synchronous motor or generator immediately in response to a change in load or line voltage, and thereby minimize hunting.

Another object of the invention is to utilize changes in the line current to a synchronous motor to eliminate jitter in a motor-driven facsimile recorder by controlling the line current conditions of the driving motor.

Figure 2:
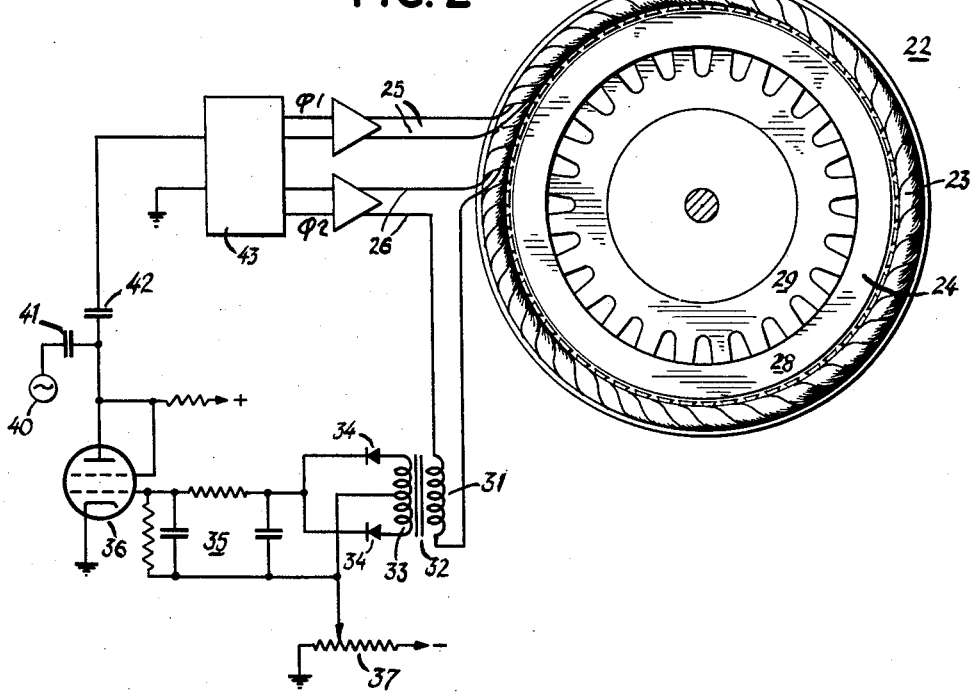

The invention, together with further objects and advantages thereof, will best be understood by reference to the following description taken in connection with the accompanying drawings in which:

FIG. 1 is a diagrammatic representation of a polyphase synchronous system embodying the invention; and FIG. 2 is a similar view of a modification employing a two-phase synchronous motor and an anti-hunting or stabilizing system including a space-discharge device.

Referring to the drawings, in FIG. 1 a polyphase synchronous motor or generator 10 is shown comprising a stator winding 11 and a rotor 12. This showing is intended to represent generally any synchronous polyphase rotating machine. As shown, the stator winding 11 has three terminals which are connected to the terminals 13, 14 and 15 of a three-phase line circuit. The polyphase rotating machine 10 may be of the conventional type which includes a stator with a magnetizable core on which the stator winding is wound so as to produce a rotating field when energized from a polyphase source of current. The rotor 12 has a magnetizable core and suitable means to produce a magnetic field having a number of magnetic poles, equal to the number of poles in the stator winding 11. The rotor magnetic field is produced by a D.C. excited winding or by a permanent magnet. In a synchronous motor of this type, as is well known, when the rotor is brought up substantially to a synchronous speed, the rotor locks in and rotates in unison with the rotating magnetic field of the stator, thus delivering power at constant speed to the load.

In accordance with the invention, an error detector 17 is connected in series relation with one of the line conductors to the synchronous machine 10. The error detector 17 is arranged to detect changes in the magnitude of the line current to the motor or from the generator 10. Conventional phase shifting means 18a, 18b and 18c are connected in the respective line conductors to the machine 10 and are controlled through the conductor 20 connected to the error detector 17. Assuming that the rotor of the motor is retarded momentarily as by a sudden increase in the load the magnitude of the line current in the motor changes to a significant extent. In the case of a decrease in load, a like change occurs but of opposite sign. By utilizing this change to control the phase of the line current in the proper sense, the transient forces on the rotor, tending to produce hunting, are opposed and the hunting is substantially reduced. It is found that the compensating effect of the phase shift as described accomplishes the desired result whether the change in the angular position of the rotor is due to a change in load, voltage supply, or other cause. If desired, the compensation may be effected rapidly or instantaneously and this is advantageous in most applications.

The correcting or compensating function is probably transient as are the forces tending to cause oscillation or hunting. In the case of synchronous generating systems employing a plurality of parallel generators, hunting is a serious problem in many cases as a consequence of sudden changes in load on the system. The invention provides a means of quickly correcting or compensating for the conditions which lead to hunting and thus minimize this condition before the regulator of the prime mover driving each synchronous generator has time to adjust the input power to the change in load.

FIG. 2 illustrates by way of example, the detailed circuit of a phase shift arrangement that may be employed in connection with a precision drive synchronous motor, as used for example in facsimile recording equipment. In this figure, a synchronous motor 22 is shown as comprising stator windings 23 and a rotor 24. The distributed stator windings 23 are shown as connected to a split-phase source, consisting of the pairs of conductors 25 and 26. The rotor 24 comprises a magnetizable circumferential section 28 and an inner permanent magnet 29 forming radial magnetic poles. The rotor is thus provided with a plurality of magnetic poles equal in number to the stator poles.

In order to detect changes in the amplitude of the motor current caused by load variations, the primary winding 31 of a transformer 32 is connected in series relation with one of the phases of the stator circuit. The secondary winding 33 of the transformer 32 is connected through rectifiers 34 and a filter 35 to the grid of an amplifier tube or space-discharge device 36. A potentiometer 37 is provided to adjust the potential of the grid of the tube 36. The filter 35 is a low-pass filter of conventional design consisting of a series resistor and two shunt capacitors for attenuating the higher frequency components of the voltage or potential derived from the current-responsive means 31–34.

As shown, the synchronous motor 22 is driven at a constant speed from the constant-frequency alternating-current source 40. The power source 40 is connected through capacitors 41 and 42 to the phase-splitting system 43; providing a two-phase output in the conductors 25 and 26 with the respective voltages maintained exactly 90 degrees apart in phase. The output of the phase-splitter 43 may be amplified if desired in the conventional manner as indicated.

The condenser 41 is shunted by the cathode-anode path of the space-discharge tube 36 so that as the impedance of the tube is varied, the phase of the motor current from the power source 40 is shifted in the correct sense to alter the phases of the voltages supplied to the stator windings 23, to correct for or compensate for the oscillations that normally occur as a consequence of a change in load on the motor. It is found that by this arrangement, upon the occurrence of random load variations, the tendency of the rotor to oscillate is effectively eliminated or minimized. In a facsimile recorder, the jitter is imperceptible even if the load variations in the driven mechanism are relatively large.

While we have shown and described particular embodiments of the present invention, it will be understood that various modifications and alternative constructions may be made without departing from its spirit and scope. Such modifications include synchronous generators as well as motors of various types and either two-phase or three-phase rotating machines. While the compensating system preferably includes a vacuum-tube amplifier, or equivalent, it is evident that other types of amplifiers and phase-shifting devices may be employed if desired.

We claim:

1. In a stabilizing system for a synchronous motor having a rotor, a stator and stator windings to produce a rotating field coupled to said rotor, a source of current for said motor, line conductors connecting said source to said stator windings, a transformer having a primary winding in series relation with one of said line conductors and a secondary winding inductively coupled to said primary winding, rectifying means connected to said secondary winding for deriving a control potential which varies with changes in the amplitude of the current in said primary winding of the transformer, anti-hunting means for minimizing oscillations of said rotor controlled by said control potential and a low pass filter connected between said rectifying means and said anti-hunting means, said low pass filter including a D.C. resistance path coupling said anti-hunting means and rectifying means.

2. In a stabilizing system for a synchronous rotating machine having a rotor, a stator, and stator windings to produce a rotating stator field, an alternating-current power line connected to said windings, phase-shifting means in said power line, a current transformer connected in one of said power lines, a rectifier and a low-pass filter including a D.C. coupling resistive path coupling said current transformer and said phase-shifting means, and means including said current transformer, rectifier and filter for controlling said phase-shifting means to minimize hunting or oscillatory movement of said rotor.

References Cited by the Examiner

UNITED STATES PATENTS

| | | | |
|---|---|---|---|
| 2,415,405 | 2/47 | Barney | 318—189 |
| 2,640,179 | 5/53 | Alexanderson | 318—180 |
| 2,803,792 | 8/57 | Turner | 318—175 |

JOHN F. COUCH, *Primary Examiner.*

ORIS L. RADER, *Examiner.*